(12) United States Patent
Yu

(10) Patent No.: US 7,755,857 B2
(45) Date of Patent: Jul. 13, 2010

(54) LENS MODULE

(75) Inventor: Sheng-Jung Yu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/339,321

(22) Filed: Dec. 19, 2008

(65) Prior Publication Data
US 2009/0279191 A1 Nov. 12, 2009

(30) Foreign Application Priority Data
May 6, 2008 (CN) .................. 2008 1 0301419

(51) Int. Cl.
*G02B 7/02* (2006.01)
(52) U.S. Cl. ..................... 359/819; 359/811
(58) Field of Classification Search .............. 359/819, 359/811, 793, 784, 821, 829, 830; 396/529
See application file for complete search history.

(56) References Cited

U.S. PATENT DOCUMENTS

| 5,024,509 | A  | * | 6/1991  | Kurihara ............... 359/741 |
| 6,592,077 | B2 | * | 7/2003  | Uhlemann et al. ....... 244/129.3 |
| 7,088,530 | B1 | * | 8/2006  | Recco et al. .......... 359/811 |
| 7,131,772 | B2 | * | 11/2006 | Nomura ............... 396/349 |

* cited by examiner

*Primary Examiner*—Mohammed Hasan
(74) *Attorney, Agent, or Firm*—Clifford O. Chi

(57) ABSTRACT

A spacer includes an annular spacing portion defining a first surface and an opposite second surface, a flange defining a through opening; and a connecting portion connecting the flange to the spacing portion. The connecting portion defines a first inclined stopping surface and a second inclined stopping surface on opposite sides thereof. The first and second inclined stopping surfaces respectively extend from the first and second surfaces of the spacing portion to the flange.

6 Claims, 3 Drawing Sheets

LENS MODULE

CROSS-REFERENCE TO RELATED APPLICATIONS

This application is related to commonly-assigned copending applications Ser. No. 12/061,893, entitled "Lens with Collar and Lens Module Using same", Ser. No. 12/168,785, entitled "Lens Module and Optical Module Incorporating the same", Ser. No. 12/248,287, entitled "Optical Lens Assembly and Lens Module" Incorporating the same", and Ser. No. 12/247,402, entitled "Optical Lens Group and Related Lens Module". Disclosures of the above-identified applications are incorporated herein by reference.

BACKGROUND

1. Technical Field

The present invention generally relates to lens module, and particularly to spacer used in lens modules and lens module having the same.

2. Discussion of Related Art

With the development of the optical imaging technology, lens modules are widely used in a variety of electronic devices, such as digital cameras and mobile phones. Referring to FIG. 3, a typical lens module 30 includes a barrel 31, two lenses 32 and an annular spacer 33 disposed in the barrel 31. The annular spacer 33 is interposed between the two lenses 32 such that the two lenses 32 are spaced apart from each other. The spacer 33 has a through hole for allowing light to pass through. Each of the lenses 32 includes a central portion 321 for allowing light to pass through and an annular supporting portion 322 for supporting the central portion. Light in the supporting portion can also pass through the through hole of the spacer 32, which may negatively affect imaging quality of the lens module 30.

In addition, to improve an imaging quality of the lens module 30, optical axes of the two lenses 32 and central axis of the barrel 31 must be in a same line. However, during assembling of the lens module 30, misalignment of optical axes of the two lenses 32 may occur due to dimensional tolerance of the two lenses 32 and the barrel 31. To meet trend of miniaturization in electronic devices, size of lens modules are becoming smaller and smaller, and also, it is more and more difficult to align optical axes of different optical components (i.e. optical lenses, spacers and filters) in lens modules.

Therefore, there is a desire to provide a lens module capable of overcoming above disadvantages.

BRIEF DESCRIPTION OF THE DRAWINGS

Many aspects of the present spacer and lens module can be better understood with reference to the following drawings. The components in the drawings are not necessarily drawn to scale, the emphasis instead being placed upon clearly illustrating the principles of the present lens module.

DETAILED DESCRIPTION OF THE EXEMPLARY EMBODIMENTS

Figure 1:
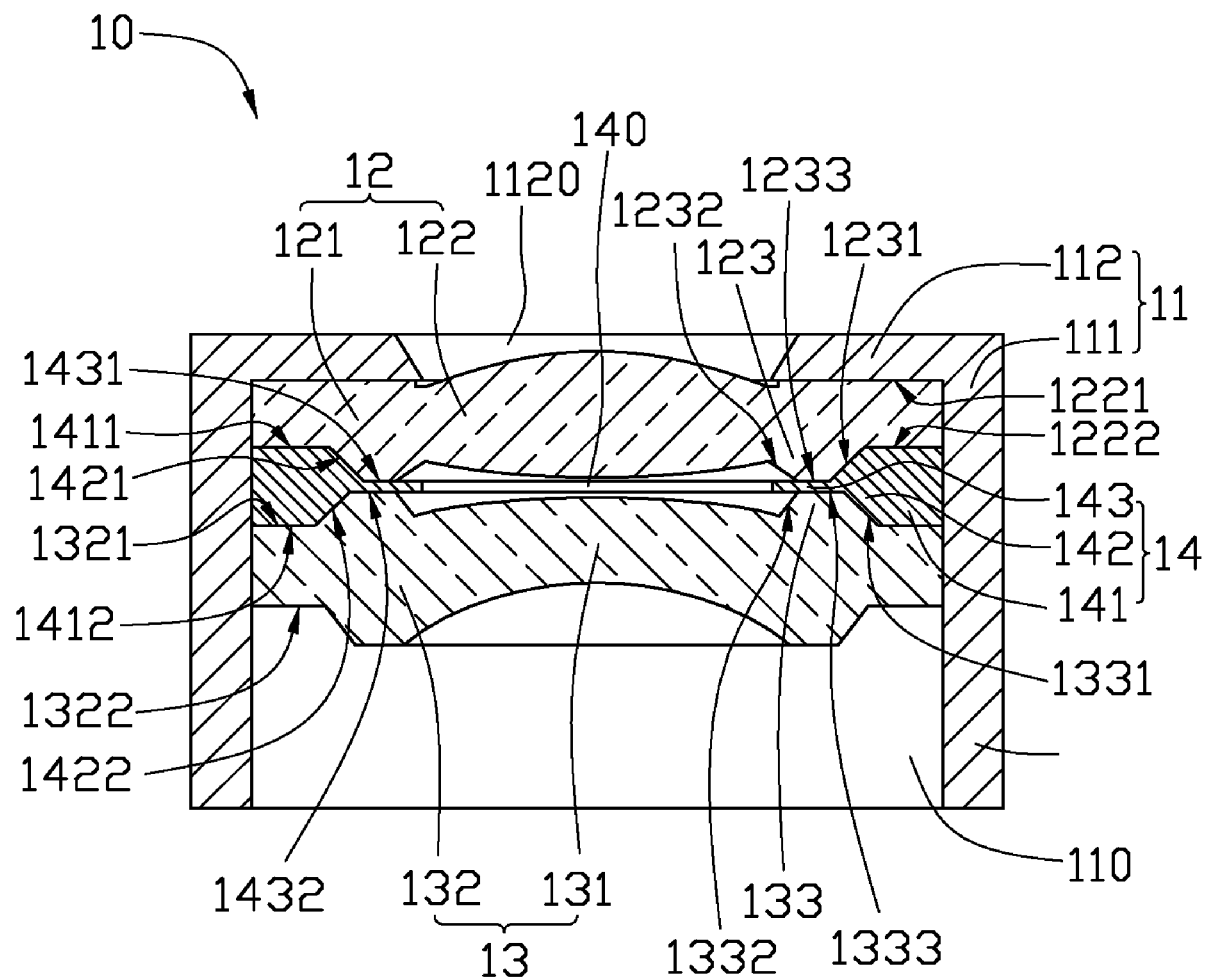
FIG. 1 is a cross sectional view of a lens module in accordance with a first embodiment.

Referring to FIG. 1, a lens module 10 in accordance with a first embodiment includes a barrel 11, and a first lens 12, a second lens 13, and a spacer 14 disposed in the barrel 11. The spacer 14 is sandwiched between the first lens 12 and the second lens 13.

The barrel 11 has a cylindrical body 111 defining a cylindrical receiving chamber 110 and a top cover 112 formed on an end of the cylindrical body 111. In the first embodiment, the cylindrical body 111 is integrally formed with the top cover 112. The top cover 112 has a circular through opening 1120 defined in its central portion for allowing light to pass through.

The first lens 12 includes an optical portion 122 and an annular supporting portion 121 surrounding the optical portion 122. The optical portion 122 is structured to have a special shape so that it is capable of achieving certain optical effect such as diverging or converging light beams. The supporting portion 121 serves as a retainer to hold the optical portion 122 at predetermined position. In the first embodiment, the optical portion 122 and the annular supporting portion 121 are integrally formed. However, it is understood that the supporting portion 121 and the optical portion 122 can also be separately formed and then assembled together.

The supporting portion 121 has a top surface 1221 and a bottom surface 1222. An annular protrusion 123 is formed on the bottom surface 1222 and around the optical portion 122. The annular protrusion 123 has a first inclined surface 1231, a second inclined surface 1232 and a contact surface 1233 between the first inclined surface 1231 and the second inclined surface 1232. The first inclined surface 1231 extends from the bottom surface 1222 to the contact surface 1233. The second inclined surface 1232 extends from the optical portion 122 to the contact surface 1233. The contact surface 1233 is parallel to the bottom surface 1222.

The second lens 13 includes an optical portion 131 and an annular supporting portion 132 surrounding the optical portion 131. The optical portion 131 is structured to have a special shape so that it is capable of achieving certain optical effect such as diverging or converging light beams. The supporting portion 132 servers as a retainer to hold the optical portion 131 at predetermined position. In the first embodiment, the optical portion 131 and the annular supporting portion 132 are integrally formed. However, it is understood that the supporting portion 132 and the optical portion 131 can also be separately formed and then assembled together.

The supporting portion 132 has a top surface 1321 and a bottom surface 1322. An annular protrusion 133 is formed on the top surface 1321 and around the optical portion 131. The annular protrusion 133 has a first inclined surface 1331, a second inclined surface 1332 and a contact surface 1333 between the first inclined surface 1331 and the second inclined surface 1332. The first inclined surface 1331 extends from the top surface 1321 to the contact surface 1333. The second inclined surface 1332 extends from the optical portion 131 to the contact surface 1333. The contact surface 1333 is parallel to the top surface 1321.

The spacer 14 is annular and defines a circular through opening 140 for allowing light to pass through. The spacer 14 includes a spacing portion 141, a flange 143, and a connecting portion 142 connecting the flange 143 to the spacing portion 141. The flange 143 is nearer to the through opening 140, and the spacing portion 141 is farther away from the through opening 140. The flange 143 is thinner than the spacing portion 141. A thickness of the connecting portion 142 decreases from an end adjoining the spacing portion 141 to an end adjoining the flange 143. As a result, a first inclined stopping surface 1421 and a second inclined stopping surface 1422 are defined on two opposite sides of the connecting portion 142.

The spacing portion 141 has a first surface 1411 and an opposite second surface 1412. The first surface 1411 is in contact with the bottom surface 1222 of the first lens 12, and the second surface 1412 is in contact with the top surface 1321 of the second lens 13. The first lens 12 and the second lens 13 are spaced apart from each other by the spacing portion 141. The first and the second inclined stopping surface 1421, 1422 are respectively in contact with the two first inclined surfaces 1231, 1331. Thus, the first and second lens 12, 13 are aligned with each other at predetermined position relative to the spacer 14. In the first embodiment, central axes of the first lens 12 and the second lens 13 lie in a same line. In addition, a thickness of the spacing portion 141 is in accordance with a practical optical design of the lens module 10. As such, the first and second lenses 12, 13 are optically coupled to each other.

The flange 143 has a first surface 1431 and an opposite second surface 1432. The first surface 1431 is in contact with the first lens 12 and is opposite to the second lens 13. In the first embodiment, the first surface 1431 is in contact with the contact surface 1233 of the annular protrusion 123. The second surface 1432 is in contact with the second lens 13 and is opposite to the first lens 12. In the first embodiment, the second surface 1432 is in contact with the contact surface 1333 of the annular protrusion 133. The flange 143 is annular, and an inner diameter thereof (i.e., a diameter of the through opening 140) is less than diameters of the optical portions 122, 131. Thus, the annular protrusions 123, 133 are separated by the flange 143. The flange 143 is made of an opaque material such as opaque plastic. Available examples of opaque plastic include polyethylene terephthalate (PET), and polycarbonate (PC) with opaque pigments dispersed therein. Thus, light from the annular protrusion 123 is absorbed by the opaque flange 143 and cannot go into the second lens 13. Light noise in the lens module 10 can be reduced, and an imaging quality of the lens module 10 can be improved.

In addition, it is to be understood that the first surface 1431 can also be spaced apart from the annular protrusion 123, and the second surface 1432 can also be spaced apart from the annular protrusion 133.

In a process of assembling the lens module 10, the first lens 12, the spacer 14, and the second lens 13 can be disposed in sequence in the barrel 111 along a central axis thereof and stacked together such that the first and the second inclined stopping surfaces 1421, 1422 are respectively in contact with the two first inclined surfaces 1231, 1331. In another method of assembling the lens module 10, firstly, the first lens 12, the spacer 14, and the second lens 13 can be assembled together and then mounted in the barrel 111.

During the assembling process, the first lens 12, the second lens 13 can be easily held at predetermined position relative to the spacer 14 due to the first and the second inclined stopping surface 1421,1422. That is, a precise alignment of optical axes of the first and second lens 12, 13 can be easily achieved. In addition, if any one of the first lens 12, the second lens 13, and the spacer 14 is aligned with the barrel 111, the others are also aligned with the barrel 111.

Figure 2:
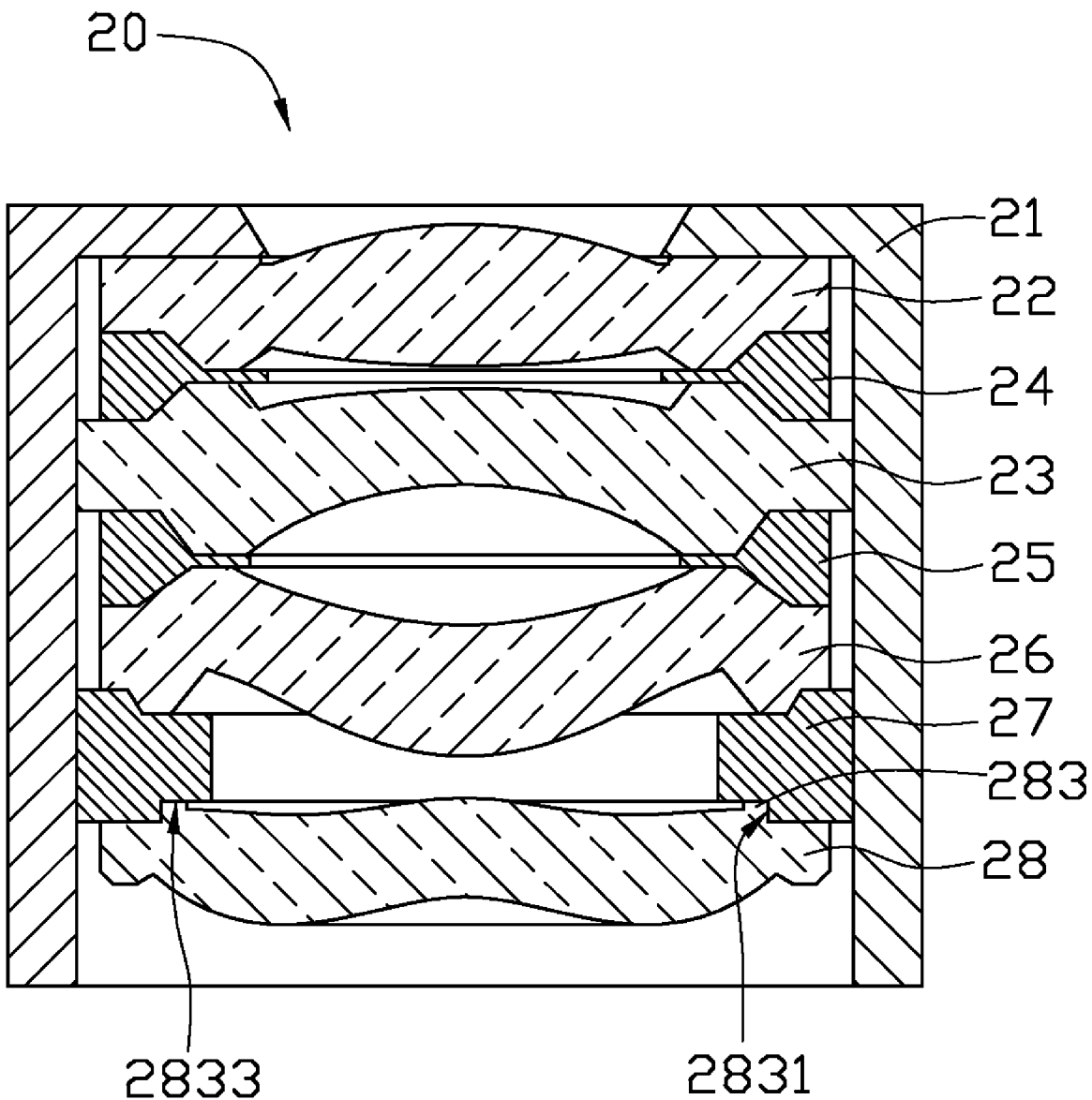
FIG. 2 is a cross sectional view of a lens module in accordance with a second embodiment.
Figure 3:
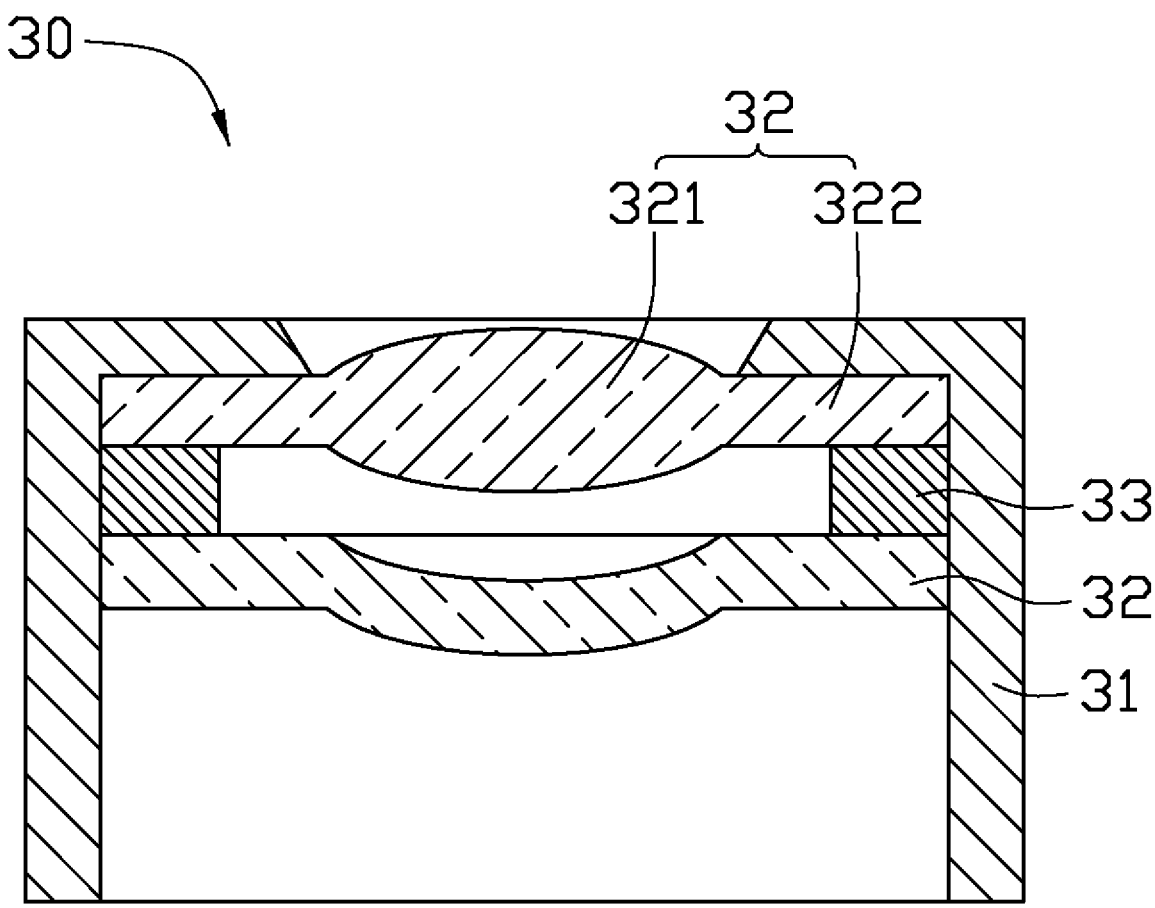
FIG. 3 is a cross sectional view of a general typical conventional lens module.

Referring to FIG. 2, a lens module 20 in accordance with a second embodiment is shown. The lens module 20 is similar to the lens module 10, except that the lens module 20 further includes a second spacer 25, a third lens 26, a third spacer 27 and a fourth lens 28. The second spacer 25 and the third spacer 27 each have similar structure to the first spacer 24. The fourth lens 28 is an aspherical lens, and has an annular protrusion 283 formed on a surface thereof that is opposite to the third lens 26. The annular protrusion 283 has a columnar outer side surface 2831 and an annular top surface 2833 perpendicularly adjoining the outer side surface 2831.

In the second embodiment, outer diameter of the first lens 22, the first spacer 24, the second spacer 25, the third lens 26, and the fourth lens 28 is less than that of the second lens 23 and the third spacer 27. Outer diameter of the second lens 23 and the third spacer 27 is equal to an inner diameter of the barrel 21. The second lens 23 and the third spacer 27 ensure alignment of the optical axes of the four lenses. In addition, it is to be understood that if the diameter of one or more of the four lenses and the three spacers is equal to the inner diameter of the barrel 21 the four lenses can be aligned with the barrel 21.

In each of the lens modules 10 and 20, alignment of optical axes of lenses can be easily achieved due to the inclined stopping surfaces formed on the spacers and the inclined surfaces formed on the lenses. Additionally, the flanges of the spacers can absorb light noise in each of the lens modules 10 and 20, thus, the imaging quality can also be improved.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A lens module, comprising:
   a barrel, and a first lens, a second lens, and a spacer disposed in the barrel;
   the spacer being interposed between and in tight contact with the first and second lenses, the spacer comprising:
   an annular spacing portion having a first surface and an opposite second surface;
   a flange defining a through opening therein; and
   a connecting portion connecting the flange to the spacing portion;
   wherein the connecting portion has a first inclined stopping surface and a second inclined stopping surface on opposite sides thereof, and the first and second inclined stopping surfaces respectively extending from the first and second surfaces of the spacing portion to the flange;
   the first lens comprising a first protrusion shaped to mate with the first inclined stopping surface, the second lens comprising a second protrusion shaped to mate with the second inclined stopping surface.

2. The lens module as claimed in claim 1, wherein a thickness of the flange is less than that of the spacing portion.

3. The lens module as claimed in claim 1, wherein the flange is made of opaque material.

4. The lens module as claimed in claim 3, wherein the flange is made of polymer with opaque pigments dispersed therein.

5. The lens module as claimed in claim 1, wherein a diameter of each of the first and second lenses is less than an inner diameter of the barrel.

6. The lens module as claimed in claim 1, wherein the flange extends toward a center of the through opening exceeding the protrusions of the first and second lenses.

* * * * *